US008495308B2

(12) United States Patent
Guthrie et al.

(10) Patent No.: US 8,495,308 B2
(45) Date of Patent: Jul. 23, 2013

(54) PROCESSOR, DATA PROCESSING SYSTEM AND METHOD SUPPORTING A SHARED GLOBAL COHERENCY STATE

(75) Inventors: Guy L. Guthrie, Austin, TX (US); William J. Starke, Round Rock, TX (US); Derek E. Williams, Austin, TX (US); Phillip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 1553 days.

(21) Appl. No.: 11/539,694

(22) Filed: Oct. 9, 2006

(65) Prior Publication Data

US 2008/0086602 A1 Apr. 10, 2008

(51) Int. Cl.
*G06F 12/00* (2006.01)

(52) U.S. Cl.
USPC .................... 711/144; 711/141; 711/E12.032

(58) Field of Classification Search
USPC ................................................. 711/144, 141
See application file for complete search history.

(56) References Cited

U.S. PATENT DOCUMENTS

| 5,060,141 | A | 10/1991 | Wakatani |
|---|---|---|---|
| 5,852,716 | A | 12/1998 | Hagersten |
| 6,038,644 | A | 3/2000 | Irie et al. |
| 6,038,651 | A | 3/2000 | VanHuben et al. |
| 6,606,676 | B1 | 8/2003 | Deshpande et al. |
| 7,096,323 | B1 | 8/2006 | Conway et al. |
| 7,162,590 | B2 | 1/2007 | Pruvost et al. |
| 7,526,631 | B2 | 4/2009 | Arimilli et al. |
| 2001/0021187 | A1 | 9/2001 | Saeki et al. |
| 2003/0009637 | A1 | 1/2003 | Arimilli et al. |
| 2003/0097529 | A1 | 5/2003 | Arimilli et al. |
| 2003/0154350 | A1 | 8/2003 | Edirisooriya et al. |
| 2004/0190546 | A1 | 9/2004 | Jackson |
| 2006/0179242 | A1* | 8/2006 | Ghai et al. ..................... 711/141 |
| 2006/0179250 | A1* | 8/2006 | Guthrie et al. ................ 711/143 |
| 2006/0224833 | A1* | 10/2006 | Guthrie et al. ................ 711/141 |

FOREIGN PATENT DOCUMENTS

JP 2006285992 A 10/2006

OTHER PUBLICATIONS

Patterson and Hennessy; "Computer Architecture—A Quantative Approach"; 1996; Morgan Kaufmann Publishers; $2^{nd}$ Edition; p. 75.
U.S. Appl. No. 11/055,483 entitled "Data Processing System and Method for Efficient Coherency Communication Utilizing Coherency Domain Indicators"; Notice of Allowance dated Mar. 13, 2012 (18 pg.).

(Continued)

*Primary Examiner* — Reginald Bragdon
*Assistant Examiner* — Aracelis Ruiz
(74) *Attorney, Agent, or Firm* — Yudell Isidore Ng Russell PLLC

(57) ABSTRACT

A multiprocessor data processing system includes at least first and second coherency domains, where the first coherency domain includes a system memory and a cache memory. According to a method of data processing, a cache line is buffered in a data array of the cache memory and a state field in a cache directory of the cache memory is set to a coherency state to indicate that the cache line is valid in the data array, that the cache line is held in the cache memory non-exclusively, and that another cache in said second coherency domain may hold a copy of the cache line.

17 Claims, 10 Drawing Sheets

OTHER PUBLICATIONS

U.S. Appl. No. 11/055,483 entitled "Data Processing System and Method for Efficient Coherency Communication Utilizing Coherency Domain Indicators"; Non-final office action dated Mar. 21, 2007 (11 pg.).

U.S. Appl. No. 11/055,483 entitled "Data Processing System and Method for Efficient Coherency Communication Utilizing Coherency Domain Indicators"; Final office action dated Oct. 19, 2007 (13 pg.).

* cited by examiner

PROCESSOR, DATA PROCESSING SYSTEM AND METHOD SUPPORTING A SHARED GLOBAL COHERENCY STATE

CROSS-REFERENCE TO RELATED APPLICATION

The present application is related to U.S. patent application Ser. No. 11/055,483, which is incorporated herein by reference in its entirety.

BACKGROUND OF THE INVENTION

1. Technical Field

The present invention relates in general to data processing systems, and more particularly to an improved multi-processor data processing system. Still more particularly, the present invention relates to improved coherency management of a hierarchical cache system within a multi-processor data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of cache states stored in association with the cache lines stored at each level of the cache hierarchy, as well as a set of coherency messages utilized to communicate the cache state information between cache hierarchies. In a typical implementation, the cache state information takes the form of the well-known MESI (Modified, Exclusive, Shared, Invalid) protocol or a variant thereof, and the coherency messages indicate a protocol-defined coherency state transition in the cache hierarchy of the requestor and/or the recipients of a memory access request. The MESI protocol allows a cache line of data to be tagged with one of four states: "M" (Modified), "E" (Exclusive), "S" (Shared), or "I" (Invalid). The Modified state indicates that a coherency granule is valid only in the cache storing the modified coherency granule and that the value of the modified coherency granule has not been written to system memory. When a coherency granule is indicated as Exclusive, then, of all caches in the memory hierarchy, only that cache holds the coherency granule. The data in the Exclusive state is consistent with system memory, however, if a coherency granule is marked as Shared in a cache directory, the coherency granule is resident in the associated cache and in possibly one or more other caches in the memory hierarchy, and all of the copies of the coherency granule are consistent with system memory. Finally, the Invalid state indicates that the data and address tag associated with a coherency granule are both invalid.

The state to which each coherency granule (e.g., cache line) is set is dependent upon both a previous state of the data within the cache line and the type of memory access request received from a requesting device (e.g., the processor). Accordingly, maintaining memory coherency in the system requires that the processors communicate messages across the system bus indicating their intention to read or write to memory locations. For example, when a processor desires to write data to a memory location, the processor must first inform all other processing elements of its intention to write data to the memory location and receive permission from all other processing elements to carry out the write operation. The permission messages received by the requesting processor indicate that all other cached copies of the contents of the memory location have been or will be invalidated, thereby guaranteeing that the other processors will not incorrectly access their stale local data.

In some systems, the cache hierarchy includes at least two levels, a level one (L1) or upper level caches and one or more levels of lower level caches, such as level two (L2) caches and level three (L3) caches (the L2 caches being upper level caches relative to the L3 caches). An L1 cache is usually a private cache associated with a particular processor core in an MP system. The processor core first attempts to access data in its L1 cache. If the requested data is not found in the L1 cache, the processor core then access one or more lower level caches (e.g., level two (L2) or level three (L3) caches) for the requested data. The lowest level cache (e.g., L3) is often shared among several processor cores.

Typically, when a congruence class of an upper level cache becomes fill, data lines are "evicted" or written to a lower level cache or out to system memory for storage. However, in any memory hierarchy, there may be several copies of the same data residing in the memory hierarchy at the same time. The policy of evicting lines to provide for more space in the upper level cache results in updates to lower level caches, including updates of coherency state information in the lower level cache directory.

Heretofore, cache coherency protocols have generally assumed that to maintain cache coherency, coherency states from upper level cache are copied into lower level cache upon eviction of a cache line from an upper level cache. The present invention recognizes performance enhancements to the data processing system can be achieved by intelligently defining the coherency states and coherency state transitions in the cache hierarchy when castouts are performed and for other data processing scenarios.

SUMMARY OF THE INVENTION

The present invention provides an improved processing unit, data processing system and method of coherency management in multi-processor data processing system.

In accordance with one embodiment of the present invention, a data processing system includes at least first and second coherency domains, where the first coherency domain includes a system memory and a cache memory. According to a method of data processing, a cache line is buffered in a data array of the cache memory and a state field in a cache directory of the cache memory is set to a coherency state to indicate that the cache line is valid in the data array, that the cache line is held in the cache memory non-exclusively, and that another cache in said second coherency domain may hold a copy of the cache line.

All objects, features, and advantages of the present invention will become apparent in the following detailed written description.

BRIEF DESCRIPTION OF THE DRAWINGS

The novel features believed characteristic of the invention are set forth in the appended claims. The invention, as well as a preferred mode of use, will best be understood by reference to the following detailed description of an illustrative embodiment when read in conjunction with the accompanying drawings, in which like numbers represent the same or similar elements, wherein:

DETAILED DESCRIPTION OF PREFERRED EMBODIMENTS

I. Overview of Exemplary Architecture

Figure 1:
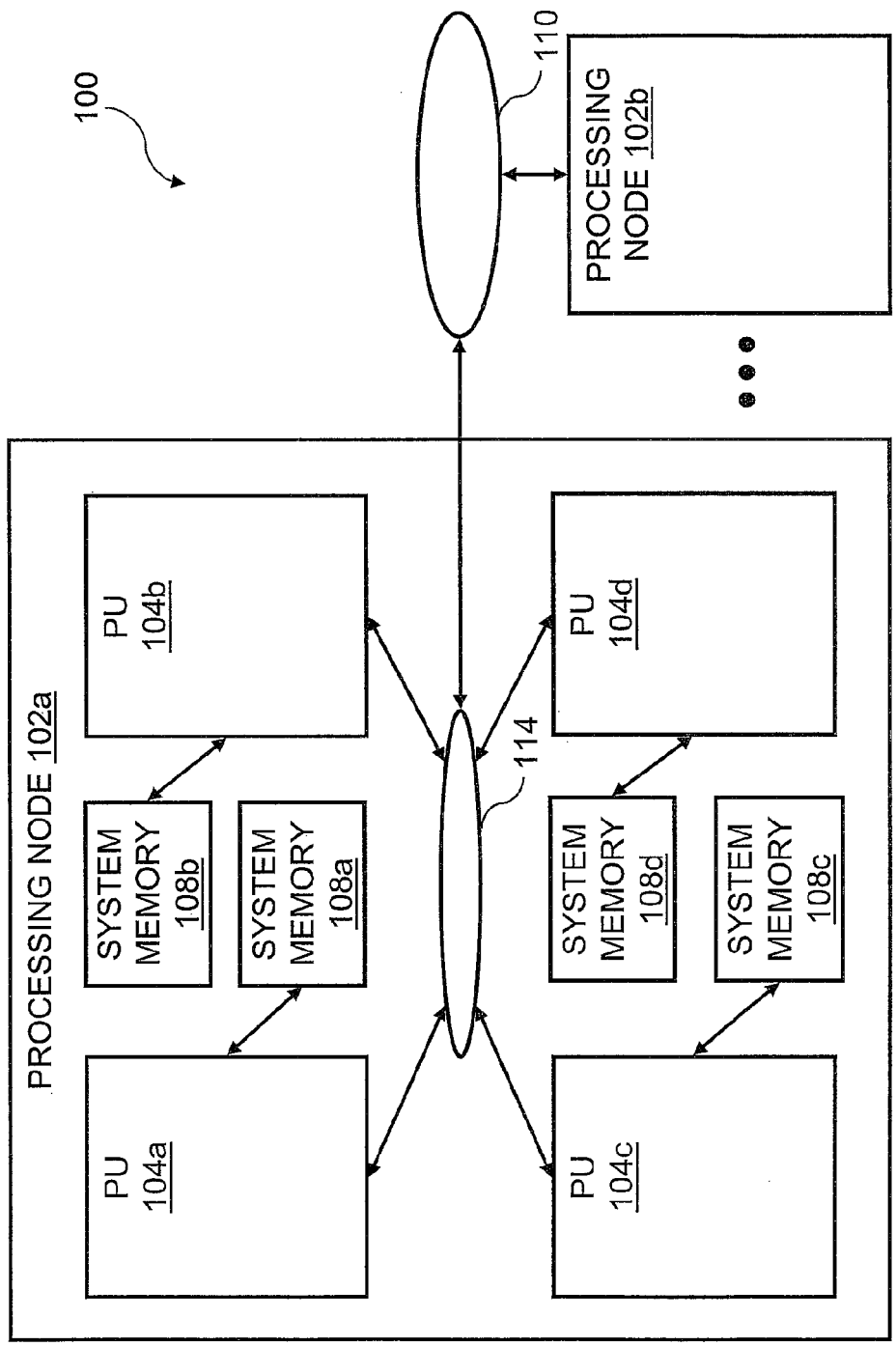
FIG. 1 illustrates a high level block diagram of an exemplary embodiment of a cache coherent symmetric multiprocessor (SMP) data processing system in accordance with the present invention.

With reference now to the figures, wherein like reference numerals refer to like and corresponding parts throughout, and in particular with reference to FIG. 1, there is illustrated a high-level block diagram depicting an exemplary data processing system in which the present invention may be implemented. The data processing system is depicted as a cache coherent symmetric multiprocessor (SMP) data processing system 100. As shown, data processing system 100 includes multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches.

Figure 2:
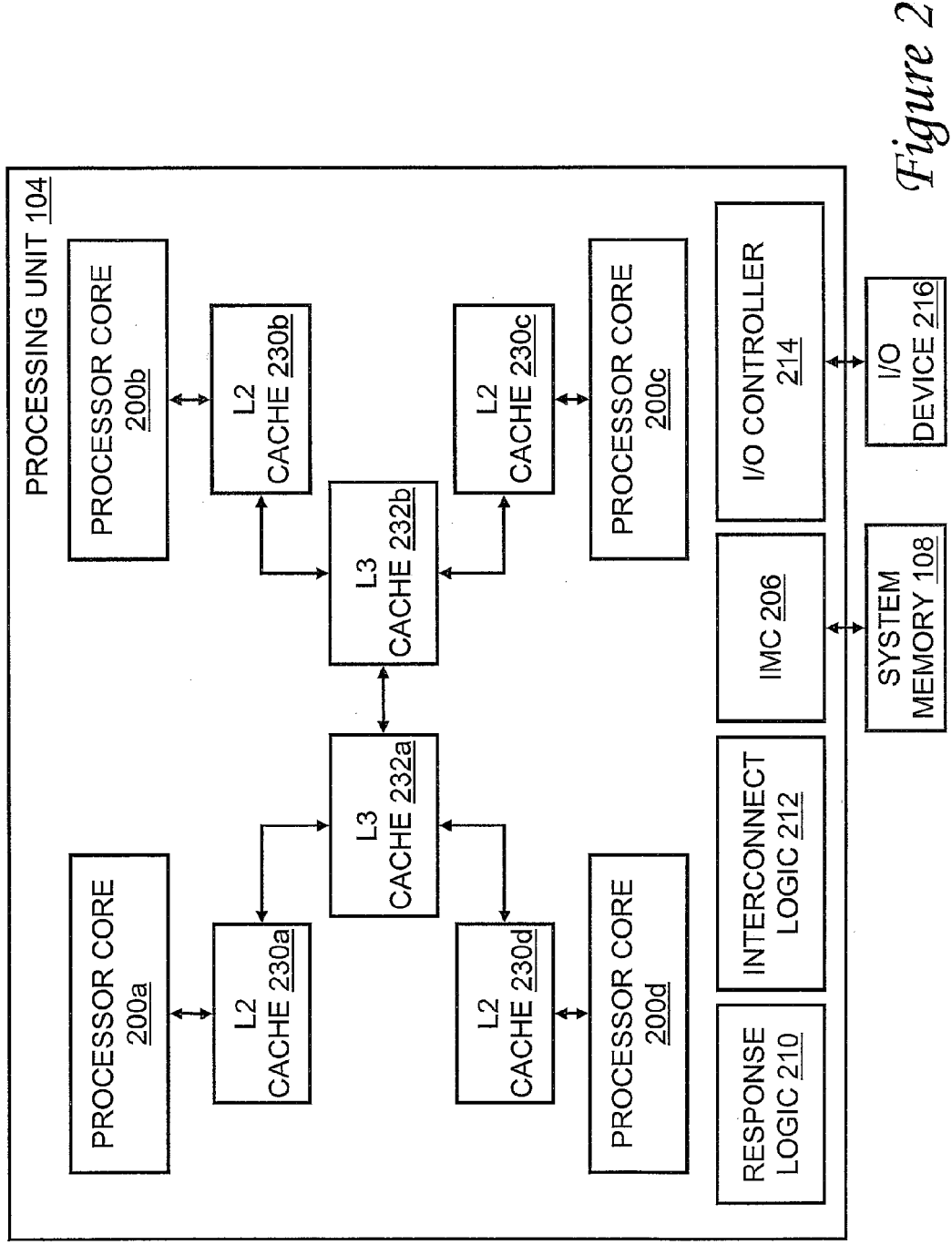
FIG. 2 is a block diagram of an exemplary processing unit in accordance with a preferred embodiment of the present invention.

As depicted in FIG. 2, processing units 104 each include an integrated memory controller (IMC) 206 coupled to a respective system memory 108. Data and instructions residing in system memories 108 can generally be accessed and modified by a processor core in any processing unit 104 of any processing node 102 within data processing system 100. In alternative embodiments of the invention, one or more memory controllers 206 (and system memories 108) can be coupled to system interconnect 110 or a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Referring now to FIG. 2, there is depicted a more detailed block diagram of an exemplary processing unit 104 in accordance with the present invention. In the depicted embodiment, each processing unit 104, which can be advantageously realized as a single integrated circuit, includes four processor cores 200a-200d for independently processing instructions and data. In one preferred embodiment, each processor core 200 supports multiple (e.g., two) concurrent hardware threads of execution.

The operation of each processor core 200 is supported by a multi-level volatile memory subsystem having at its lowest level shared system memory 108, and at its upper levels, two or more levels of cache memory for caching data and instructions residing within cacheable addresses. In the illustrative embodiment, the cache memory hierarchy includes a respective store-through level one (L1) cache (not shown) within and private to each processor core 200, a respective store-in level two (L2) cache 230 private to each processor core 200, and L3 victim caches 232 for buffering L2 castouts. In the depicted embodiment, processor cores 200a and 200d share L3 cache 232a, and processor cores 200b and 200c share L3 cache 232b. Of course, in other embodiments, each of processor cores 200 may have its own respective L3 cache 232. In at least some embodiments including that depicted in FIG. 2, L3 caches 232a-232b are further coupled together to permit data exchange, including permitting an L3 cache 232 to castout one of its cache lines into another of L3 caches 232 to preserve data likely to be accessed by a processor core 200 within the cache hierarchy of processing unit 104 for as long as possible.

Each processing unit 104 further includes an instance of response logic 210, which implements a portion of the distributed coherency signaling mechanism that maintains cache coherency within data processing system 100. In addition, each processing unit 104 includes an instance of interconnect logic 212 for managing communication between processing unit 104 and local interconnect 114 and system interconnect 110. L2 caches 230 and L3 caches 232 are each coupled to interconnect logic 212 via unillustrated connections to enable participation in data and coherency communication on interconnects 110 and 114 of FIG. 1. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 3A:
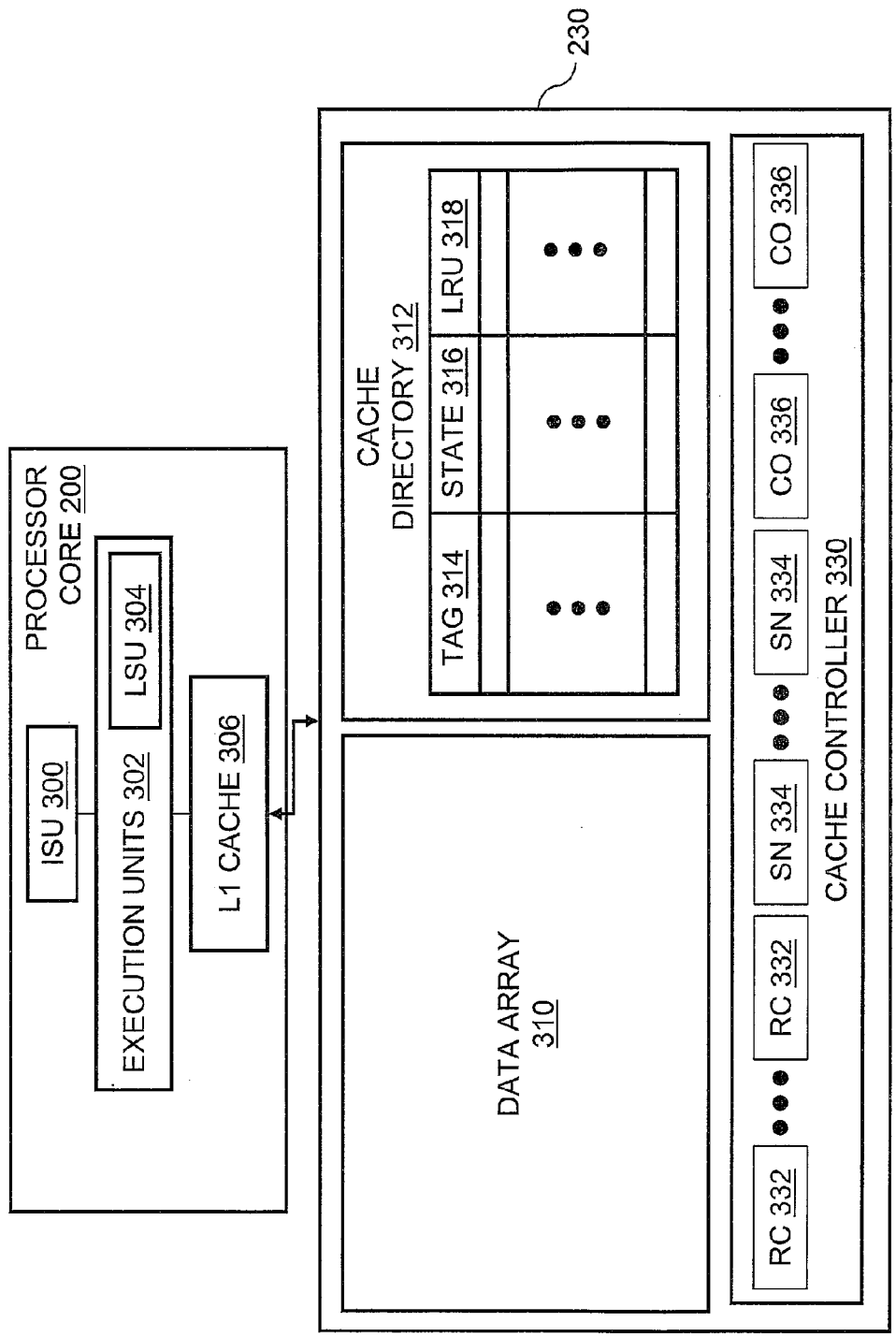
FIG. 3A is a more detailed block diagram of an exemplary embodiment of a processor core and L2 cache in accordance with a preferred embodiment of the present invention.

With reference now to FIG. 3A, there is illustrated a more detailed block diagram of a processor core 200 and L2 cache 230 within processing unit 104 of FIG. 2. As depicted, processor core 200 includes an instruction sequencing unit (ISU) 300 for fetching and ordering instructions for execution, one or more execution units 302 for executing instructions, and an L1 cache 306.

Execution units 302 include a Load-Store Unit (LSU) 304 that executes memory access (e.g., load and store) instructions to cause data to be loaded from and stored to memory. A coherent view of the contents of memory is maintained while performing such memory access operations through the implementation of a coherency protocol by the memory subsystem.

In accordance with the present invention, L1 cache 306, which may include bifurcated L1 data and instruction caches, is implemented as a store-through cache, meaning that the point of cache coherency with respect to other processor cores 200 is located below L1 cache 306 and, in the depicted embodiment, is located at L2 cache 230. Accordingly, L1 cache 306 does not maintain true cache coherency states for its cache lines, but only maintains valid/invalid bits.

L2 cache 230 contains a data array 310 that stores cache lines of instructions and data and a cache directory 312 of the contents of data array 300. As in conventional set associative caches, memory blocks in system memories 108 are mapped to particular congruence classes within data array 310 utilizing predetermined index bits within the system memory (real) addresses. The standard memory block for the coherency system is set at a 128 byte cache line in one embodiment. The particular memory blocks or cache lines stored within data array 310 are recorded in cache directory 312, which contains one directory entry for each cache line in data array 310. As understood by those skilled in the art, each directory entry in cache directory 302 comprises at least a tag field 314, which specifies the particular cache line stored in data array 310 utilizing a portion of the corresponding real address, a state field 316, which indicates the coherency state of the cache line, and a LRU (Least Recently Used) field 318 indicating a replacement order for the cache line with respect to other cache lines in the same congruence class.

As further illustrated in FIG. 3A, L2 cache 230 also includes a cache controller 330 that controls the data and coherency operations of L2 cache 230. Cache controller 330 includes multiple Read-Claim (RC) machines 332 for independently and concurrently servicing load (LD) and store (ST) requests received from the affiliated processor core 200 and multiple snoop machines (SN) 334 for independently and concurrently servicing remote memory access requests issued by processor cores other than the affiliated processor core 200 and "snooped" from local interconnect 114. As will be appreciated, the servicing of memory access requests by RC machines 332 may require the replacement or invalidation of memory blocks within data array 310. Accordingly, cache controller 330 also includes multiple CO (castout) machines 336 that manage the removal and writeback of memory blocks from data array 310.

Figure 3B:
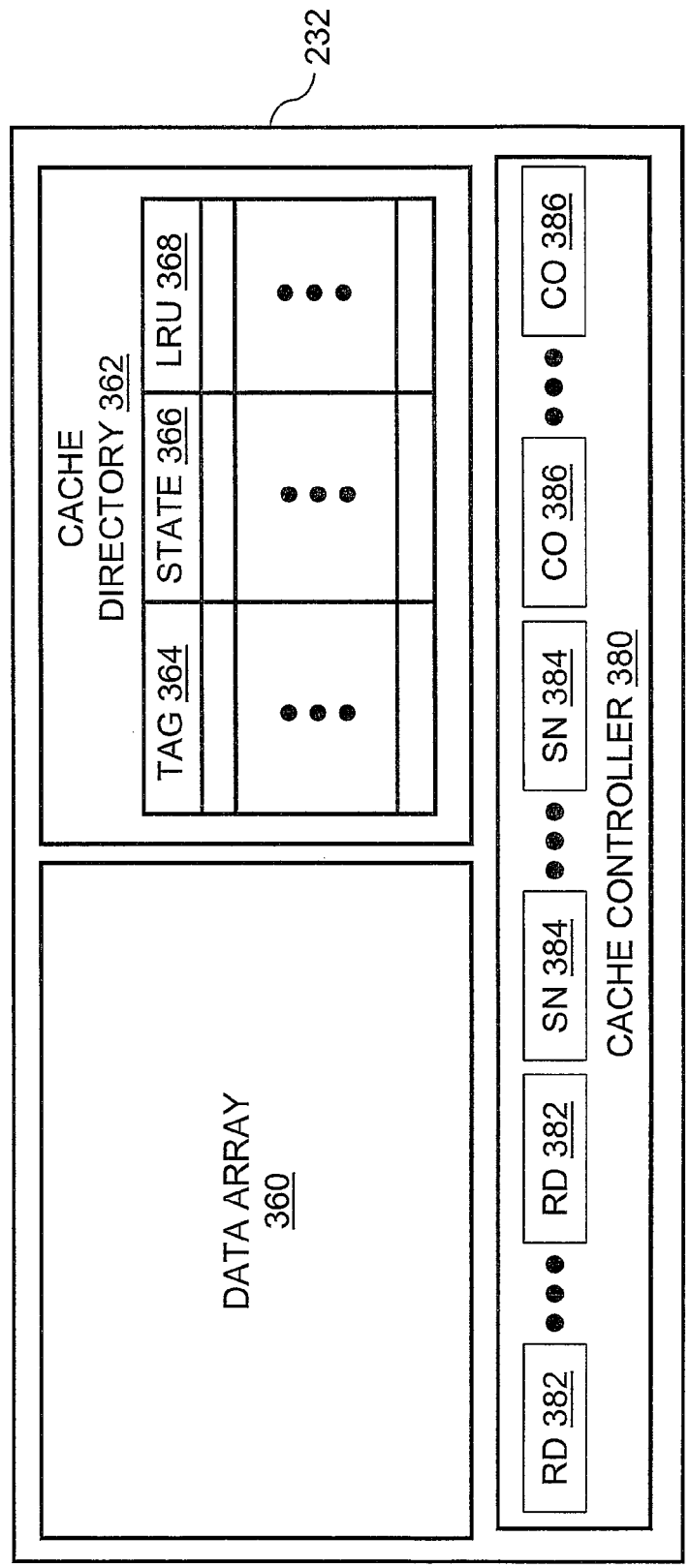
FIG. 3B is a more detailed block diagram of an exemplary embodiment of an L3 cache in accordance with a preferred embodiment of the present invention.

Referring now to FIG. 3B, there is depicted a more detailed block diagram of an exemplary embodiment of an L3 cache in accordance with the present invention. As can be seen by comparison of FIGS. 3A and 3B, L3 cache 232, which serves as a victim cache for buffering L2 castouts, is configured similarly to L2 cache 230 of FIG. 3. Accordingly, L3 cache 232 includes a set-associative data array 360, a cache directory 362 of the contents of data array 360, and a cache controller 380.

Each directory entry in cache directory 362 comprises at least a tag field 364, which specifies the particular cache line stored in data array 360 utilizing a portion of the corresponding real address, a state field 366, which indicates the coherency state of the cache line, and a LRU (Least Recently Used) field 368 indicating a replacement order for the cache line with respect to other cache lines in the same congruence class. Cache controller 380 includes multiple snoop machines 384 and multiple castout machines 386 as discussed above with respect to FIG. 3A. In lieu of RC machines, cache controller 380 includes multiple read (RD) machines 382, which service data requests of the vertically connected L2 cache 230.

II. Exemplary Operation

Figure 4:
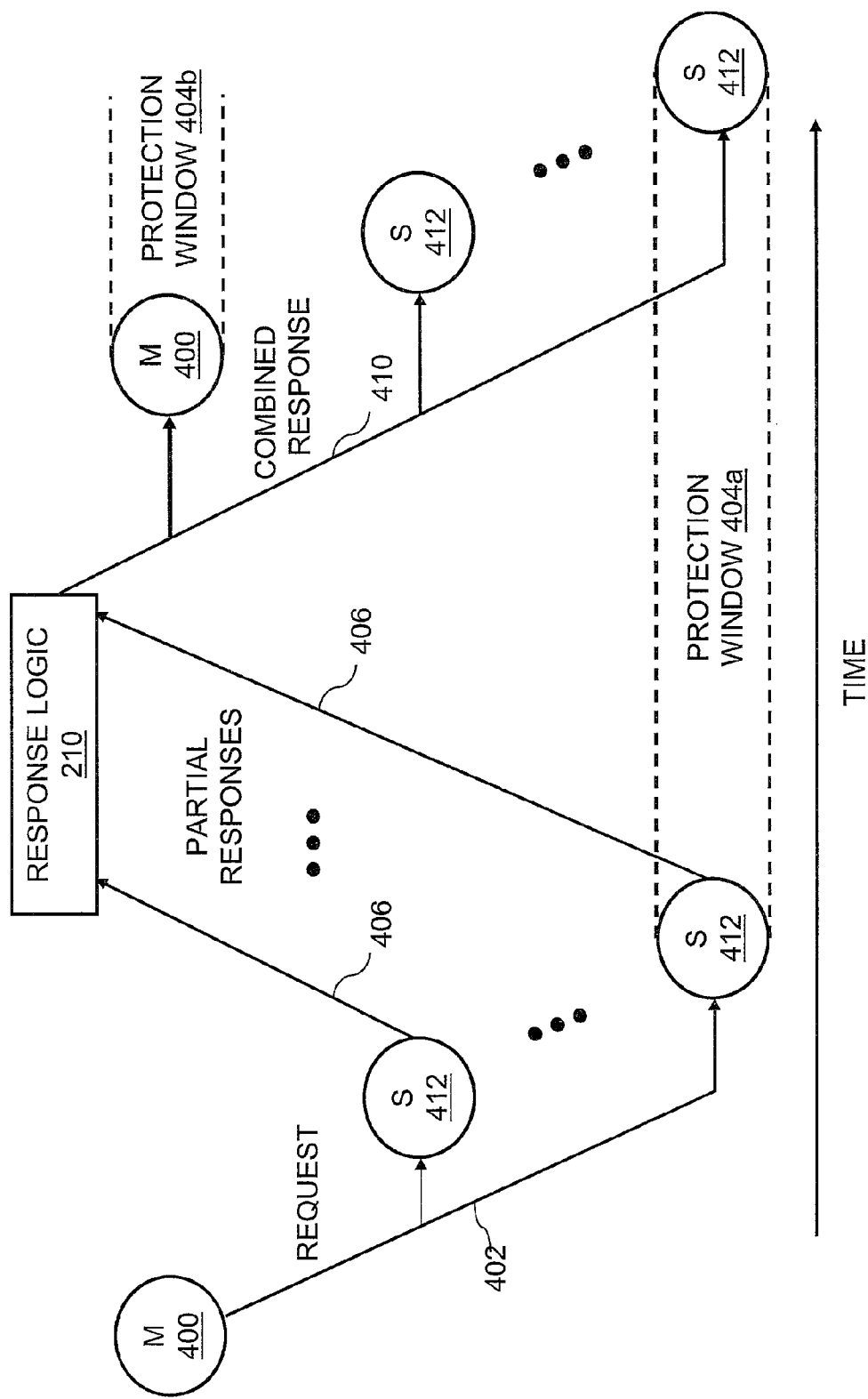
FIG. 4 is a time-space diagram of an exemplary operation on a local or system interconnect of a data processing system in accordance with a preferred embodiment of the present invention.

Referring now to FIG. 4, there is depicted a time-space diagram of an exemplary operation on a local or system interconnect 110, 114 of data processing system 100 of FIG. 1. Although interconnects 110, 114 are not necessarily bused interconnects, operations transmitted on one or more local interconnects 114 and/or system interconnect 114 are referred to herein as "bus operations" to distinguish them from CPU requests transmitted between processor cores 200 and the cache memories residing within their own cache hierarchies.

The illustrated bus operation begins when a master (M) 400, such as an RC machine 332 of an L2 cache 230 or I/O controller 214, issues a request 402 on a local interconnect 114 and/or system interconnect 110. Request 402 preferably includes a transaction type indicating a type of desired access and a resource identifier (e.g., real address) indicating a resource to be accessed by the request. Common types of requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |

TABLE I-continued

| Request | Description |
| --- | --- |
| DCBZ (Data Cache Block Zero) | Requests authority to create a new unique cached copy of a memory block without regard to its present state and subsequently modify its contents; requires destruction of other copies, if any |
| CASTOUT | Copies the image of a memory block from a higher level of memory to a lower level of memory in preparation for the destruction of the higher level copy. A cast-in is a castout received from a higher level of cache memory. |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 402 is received by the snoopers 412, such as snoop machines 334 of L2 caches 230, snoop machines 384 of L3 caches 232, and memory controllers 206 (FIG. 2). In general, with some exceptions, the snoop machines 334 in the same L2 cache 230 as the RC machine 232 that issued request 402 and the snoop machines 384 of the connected L3 cache 232 do not snoop request 402 (i.e., there is generally no self-snooping) because a request 402 is transmitted on local interconnect 114 and/or system interconnect 110 only if the request 402 cannot be serviced internally by a processing unit 104. Each snooper 412 that receives request 402 may provide a respective partial response 406 representing the response of at least that snooper to request 402. A memory controller 206 determines the partial response 406 to provide based, for example, whether the memory controller 206 is responsible for the request address and whether it has resources available to service the request. An L2 or L3 cache may determine its partial response 406 based on, for example, the availability of its L2 cache directory, the availability of a snoop machine to handle the request, and the coherency state associated with the request address in the cache directory.

The partial responses of snoopers 412 are logically combined either in stages or all at once by one or more instances of response logic 210 to determine a system-wide combined response (CR) 410 to request 402. Subject to the scope restrictions discussed below, response logic 210 provides combined response 410 to the master and snoopers of the bus operation via its local interconnect 114 and/or system interconnect 110 to indicate the system-wide response (e.g., success, failure, retry, etc.) for request 402. If CR 410 indicates success of request 402, CR 410 may indicate, for example, a data source for a requested memory block, a cache state in which the requested memory block is to be cached, and whether "cleanup" operations invalidating the requested memory block in one or more L2 caches 230 or L3 caches 232 are required.

In response to receipt of combined response 410, one or more of master 400 and snoopers 412 typically perform one or more operations in order to service request 402. These operations may include supplying data to master 400, invalidating or otherwise updating the coherency state of data cached in one or more L2 or L3 caches, performing castout operations, writing back data to a system memory 108, etc. If required by request 402, a requested or target memory block may be transmitted to or from master 400 before or after the generation of combined response 410 by response logic 210.

In the following description, the partial response of a snooper 412 to a request and the operations performed by the snooper in response to the request and/or its combined response will be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 206 for the system memory 108 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requester in response to an operation that does not modify the memory block. Thus, for a typical request in the data processing system embodiment of FIGS. 1 and 2, the HPC, if any, will be an L2 cache 230. Although other indicators may be utilized to designate an HPC for a memory block, a preferred embodiment of the present invention designates the HPC, if any, for a memory block utilizing selected cache coherency state(s) within the L2 cache directory 310 of an L2 cache 230 or L3 cache directory 362 of an L3 cache 232, as described farther below with reference to Table II.

Still referring to FIG. 4, the HPC, if any, for a memory block referenced in a request 402, or in the absence of an HPC, the LPC of the memory block, preferably has the responsibility of protecting the transfer of ownership of a memory block in response to a request 402 during a protection window 404a. In the exemplary scenario shown in FIG. 4, the snooper 412 that is the HPC for the memory block specified by the request address of request 402 protects the transfer of ownership of the requested memory block to master 232 during a protection window 404a that extends from the time that snooper 236 determines its partial response 406 until snooper 412 receives combined response 410. During protection window 404a, snooper 412 protects the transfer of ownership by providing partial responses 406 to other requests specifying the same request address that prevent other masters from obtaining ownership until ownership has been successfully transferred to master 400. Master 400 likewise initiates a protection window 404b to protect its ownership of the memory block requested in request 402 following receipt of combined response 410.

III. Data Delivery Domains

Conventional broadcast-based data processing systems handle both cache coherency and data delivery through broadcast communication, which in conventional systems is transmitted on a system interconnect to at least all memory controllers and cache hierarchies in the system. As compared with systems of alternative architectures and like scale, broadcast-based systems tend to offer decreased access latency and better data handling and coherency management of shared memory blocks.

As broadcast-based system scale in size, traffic volume on the system interconnect is multiplied, meaning that system cost rises sharply with system scale as more bandwidth is required for communication over the system interconnect. That is, a system with m processor cores, each having an average traffic volume of n transactions, has a traffic volume of m×n, meaning that traffic volume in broadcast-based systems scales multiplicatively not additively. Beyond the requirement for substantially greater interconnect bandwidth, an increase in system size has the secondary effect of increasing some access latencies. For example, the access latency of read data is limited, in the worst case, by the combined response latency of the furthest away lower level cache holding the requested memory block in a shared coherency state from which the requested data can be sourced.

In order to reduce system interconnect bandwidth requirements and access latencies while still retaining the advantages of a broadcast-based system, multiple L2 caches 230 distributed throughout data processing system 100 are permitted to hold copies of the same memory block in a "special" shared coherency state that permits these caches to supply the memory block to requesting L2 caches 230 using cache-to-cache intervention. In order to implement multiple concurrent and distributed sources for shared memory blocks in an SMP data processing system, such as data processing system 100, two issues must be addressed. First, some rule governing the creation of copies of memory blocks in the "special" shared coherency state alluded to above must be implemented. Second, there must be a rule governing which snooping L2 cache 230, if any, provides a shared memory block to a requesting L2 cache 230, for example, in response to a bus read operation or a bus RWITM operation.

Both of these issues are addressed herein through the implementation of data sourcing domains. In particular, each domain within a SMP data processing system, where a domain is defined to include one or more lower level (e.g., L2 or L3) caches that participate in responding to data requests, is permitted to include only one cache that holds a particular memory block in the "special" shared coherency state at a time. That cache, if present when a bus read-type (e.g., READ or RWITM) operation is initiated by a requesting cache in the same domain, is responsible for sourcing the requested memory block to the requesting cache. Although many different domain sizes may be defined, in data processing system 100 of FIG. 1, it is convenient if each processing node 102 (i.e., MCM) is considered a data sourcing domain. Examples of such "special" shared states (e.g., Sl and Slg) are described below with reference to Table II.

IV. Coherency Domains

While the implementation of data delivery domains as described above improves data access latency, this enhancement does not address the m×n multiplication of traffic volume as system scale increases. In order to reduce traffic volume while still maintaining a broadcast-based coherency mechanism, preferred embodiments of the present invention additionally implement coherency domains, which like the data delivery domains hereinbefore described, can conveniently (but are not required to be) implemented with each processing node 102 forming a separate coherency domain. Data delivery domains and coherency domains can be, but are not required to be coextensive, and for the purposes of explaining exemplary operation of data processing system 100 will hereafter be assumed to have boundaries defined by processing nodes 102.

The implementation of coherency domains reduces system traffic by limiting inter-domain broadcast communication over system interconnect 110 in cases in which requests can be serviced with participation by fewer than all coherency domains. For example, if processing unit 104a of processing node 102a has a bus read operation to issue, then processing unit 104a may elect to first broadcast the bus read operation to all participants within its own coherency domain (e.g., processing node 102a), but not to participants in other coherency domains (e.g., processing node 102b). A broadcast operation transmitted to only those participants within the same coherency domain as the master of the operation is defined herein as a "local operation". If the local bus read operation can be serviced within the coherency domain of processing unit 104a, then no further broadcast of the bus read operation is performed. If, however, the partial responses and combined response to the local bus read operation indicate that the bus read operation cannot be serviced solely within the coherency domain of processing node 102a, the scope of the broadcast may then be extended to include, in addition to the local coherency domain, one or more additional coherency domains.

In a basic implementation, two broadcast scopes are employed: a "local" scope including only the local coherency domain and a "global" scope including all of the other coherency domains in the SMP data processing system. Thus, an operation that is transmitted to all coherency domains in an SMP data processing system is defined herein as a "global operation". Importantly, regardless of whether local operations or operations of more expansive scope (e.g., global operations) are employed to service operations, cache coherency is maintained across all coherency domains in the SMP data processing system. Examples of local and global operations are described in detail in U.S. patent application Ser. No. 11/055,697, which is incorporated herein by reference in its entirety.

In a preferred embodiment, the scope of an operation is indicated in a bus operation by a local/global scope indicator (signal), which in one embodiment may comprise a 1-bit flag. Forwarding logic 212 within processing units 104 preferably determines whether or not to forward an operation, received via local interconnect 114 onto system interconnect 110 based upon the setting of the local/global scope indicator (signal) in the operation.

V. Domain Indicators

Figure 5:
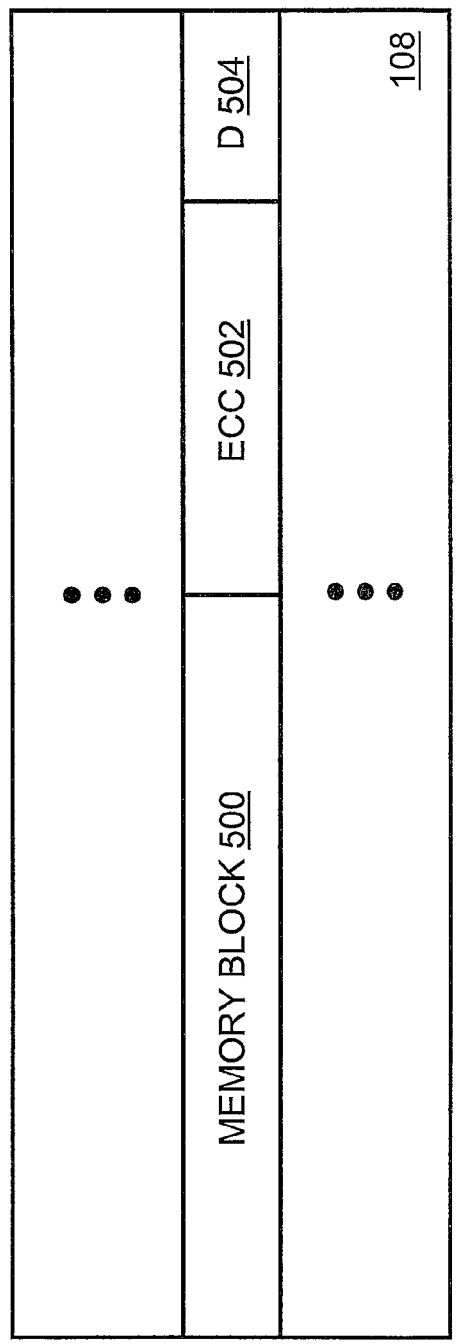
FIG. 5 illustrates a system memory including a domain indicator in accordance with a preferred embodiment of the present invention.

In order to limit the issuance of unneeded local operations and thereby reduce operational latency and conserve additional bandwidth on local interconnects, the present invention preferably implements a domain indicator per memory block that indicates whether or not a copy of the associated memory block is cached outside of the local coherency domain. For example, FIG. 5 depicts a first exemplary implementation of a domain indicator in accordance with the present invention. As shown in FIG. 5, a system memory 108, which may be implemented in dynamic random access memory (DRAM), stores a plurality of memory blocks 500. System memory 108 stores in association with each memory block 500 an associated error correcting code (ECC) 502 utilized to correct errors, if any, in memory block 500 and a domain indicator 504. Although in some embodiments of the present invention, domain indicator 504 may identify a particular coherency domain (i.e., specify a coherency domain or node ID), it is hereafter assumed that domain indicator 504 is a 1-bit indicator that is set (e.g., to '1' to indicate "local") if the associated memory block 500 is cached, if at all, only within the same coherency domain as the memory controller 206 serving as the LPC for the memory block 500. Domain indicator 504 is reset (e.g., to '0' to indicate "global") otherwise. The setting of domain indicators 504 to indicate "local" may be implemented imprecisely in that a false setting of "global" will not induce any coherency errors, but may cause unneeded global broadcasts of operations.

Memory controllers 206 that source a memory block in response to an operation preferably transmit the associated domain indicator 504 in conjunction with the requested memory block.

VI. Exemplary Coherency Protocol

In a preferred embodiment, L2 caches 230 and L3 caches 232 employ a variant of the well-known MESI (Modified, Exclusive, Shared, Invalid) protocol. In addition to providing (1) an indication of whether the cache is the HPC for a memory block, the collection of coherency states also indicates (2) whether the cached copy is unique (i.e., is the only cached copy) among caches at that memory hierarchy level, (3) whether and when the cache can provide a copy of the memory block to a master of a request, and (4) whether the cached image of the memory block is consistent with the corresponding memory block in the LPC. These four attributes can be expressed in the coherency protocol states summarized below in Table II.

TABLE II

| | NAME | DEFINITION | ENTERED WHEN (non-exhaustive listing): |
|---|---|---|---|
| I | Invalid state | Initial directory state in which the data and tag are invalid. | Power-On-Reset. Snoop invalidate from remote (domain) device (RWITM, DCLAIM, DCBZ, WRITE). |
| Ig | Invalid Global state | Data is invalid, but tag is valid in the directory. This state is a precise indication that this cache performed cache-to-cache intervention of a modified cache line to an L2 cache outside this local coherency domain. This state tracks the fact the cache line left this domain and this cache is responsible for indicating to memory controller that the domain bit needs to be set to "global". | L2 cache performs modified intervention to a master outside the coherency domain. |
| In | Invalid Node state | Data is invalid, but tag is valid in the directory. This state is an indication that the cache either performed modified intervention inside this local coherency domain or detected a store-type op. by a master inside the coherency domain. This state is a hint that the line is still in this domain and the next request for this line should be of local scope. | L2 performs modified intervention to a master inside the domain or detects a store-type op from a master inside the domain. |
| S | Shared state | Data and tag are valid. The cache line may also be valid in other L2/L3 caches. In this state, the cache line data is not sourced to another cache via intervention. | Snoop read hit (Sl) from within local coherency domain. |
| Sl | Shared Local state | Data and tag are valid. The cache line may also be valid in other L2 caches. From this state, the data can be sourced to another L2/L3 via intervention. | Processor core data load or instruction fetch. |
| Sg | Shared Global state | Data and tag are valid. The cache line may also be valid in other L2 caches. This state is a precise indication that the cache line was sourced to an L2 cache outside this local coherency domain. This state tracks the fact that this cache is responsible for indicating to memory controller that the domain bit needs to be set to "global". | CPU read hit on Ig in L2 (and appropriate combined response) or state merge in an L3. |
| Slg | Shared Local Global state | Data and tag are valid. The cache line may also be valid in other L2 caches. This state is a precise indication that the cache line was sourced to an L2 outside the local coherency domain. This state tracks the fact that this cache is responsible for indicating to memory controller that the domain bit needs to be set to "global". From this state, the data can be sourced to another L2/L3 via intervention. | CPU read hit on Ig in L2 (and appropriate combined response) or state merge in an L3. |
| Tn | Tagged Node state | Data and tag are valid. The data is modified and was sourced by this cache to another master inside this domain (i.e., was in the | Snoop read hit (M) from master inside this domain. |

TABLE II-continued

| NAME | | DEFINITION | ENTERED WHEN (non-exhaustive listing): |
|---|---|---|---|
| | | M state at sometime in the past, but is not currently exclusively owned because a shared copy was sourced to another cache in the local coherency domain). From this state, the data will not be sourced to another L2/L3 via intervention until a combined response is received indicating that no other L2/L3 is sourcing data (i.e., no L2/L3 is Sl or Slg). Castout of a Tn line requires invalidation of the tag and updating memory with data. | |
| Ten | Tagged Exclusive Node state | Data and tag are valid. The data has not been modified, but was sourced by this cache to another master inside this domain (i.e., was in the Me state at sometime in the past, and a shared copy was sourced to another cache in the local coherency domain). From this state, the data will not be sourced to another L2 via intervention until a combined response is received indicating that no other L2/L3 is sourcing data (i.e., no L2/L3 is Sl or Slg). Castout of a Ten line only requires invalidation of the tag. | Snoop read hit (Me) from master inside this domain. |
| T | Tagged state | The data and tag are valid. The data is modified, but was sourced by this cache to another master outside this domain (i.e., was in the M state at sometime in the past, but is not currently exclusively owned because a shared copy was sourced to another cache in a remote coherency domain). From this state, the data will not be sourced to another L2 via intervention until a combined response is received indicating that no other L2/L3 is sourcing data (i.e., if no L2/L3 is Sl or Slg). Castout of a T line requires invalidation of the tag, updating memory with data, and indication to the MC that the domain bit should be set to 'global'. | Snoop read hit (M) from master outside the domain. |
| Te | Tagged Exclusive state | The data and tag are valid. The data is not modified and was sourced by this cache to another master outside this domain (i.e., was in the Me state at sometime in the past, and a shared copy was sourced to another cache in a remote coherency domain). From this state, the data will not be sourced to another L2 via intervention until a combined response is received indicating that no other L2/L3 is sourcing data (i.e., if no L2/L3 is Sl or Slg). Castout of a Te line only requires invalidation of the tag and indication to the MC that the domain bit should be set to 'global' (i.e., data does not have to be castout to memory). | Snoop read hit (Me) from master outside this domain. |
| M | Modified state | The data and tag are valid. The data has been modified and is exclusively owned. The cache line cannot be valid in any other cache. From this state, the data can be sourced to another L2 (in the local MCM or a remote MCM) via intervention. | Processor core data store or DCBZ. |
| Me | Modified Exclusive state | The data and tag are valid. The data is not modified with respect to system memory and is exclusive to this L2/L3. The cache line cannot be valid in any other cache. Castout of an Me line only requires invalidation of the tag (i.e., neither the data nor the domain indicator have to be castout to memory). | LPC sources data and no other caches are Shared. |

In the embodiment of data processing system 100 described with reference to FIG. 1, domain indicators are received by L2/L3 caches 230 and 232 in conjunction with the associated memory blocks and may optionally be stored with the memory blocks in data arrays 310, 360. While this arrangement permits a simplified data flow for domain indicators, when a first L2 cache 230 responds to a bus RWITM operation of a second L2 cache 230 residing in a different coherency domain by supplying the requested memory block, no "global" indicator remains cached in the local coherency domain. Thus, the LPC must be accessed to determine whether or not the memory block is known to be cached, if at all, only locally. Consequently, if an HPC for a memory block receives a bus RWITM operation (or other storage modifying operation) from a requester in a remote coherency domain, the system responds with a retry-push including a cache castout of the requested memory block and retry of the bus RWITM operation. As will be appreciated, it would be preferable to eliminate the latency and bandwidth utilization associated with retry-push operations.

To reduce access latency to a domain indication, the Ig (Invalid Global), Sg (Shared Global), and Slg (Shared Local Global) coherency states are provided. The Ig state is defined herein as a cache coherency state indicating (1) the associated memory block in the cache array is invalid, (2) the address tag in the cache directory is valid, and (3) a modified copy of the memory block identified by the address tag was sourced to a cache in a remote coherency domain. The Sg state is defined herein as a cache coherency state indicating (1) the associated memory block in the cache array is valid, (2) the address tag in the cache directory is valid, and (3) a modified copy of the memory block identified by the address tag was sourced to a cache in a remote coherency domain, and (4) a copy of the memory block was held and may possibly still be held in another cache. The Slg state is similarly defined as a cache coherency state indicating (1) the associated memory block in the cache array is valid, (2) the address tag in the cache directory is valid, (3) a modified copy of the memory block identified by the address tag was sourced to a cache in a remote coherency domain, (4) a copy of the memory block was held and may possibly still be held in another cache, and (5) the cache has the authority to source a copy of the memory block to a master in its coherency domain by cache-to-cache data intervention.

It may be preferable to form Ig, Sg and Slg states for a given memory block only in the coherency domain containing the LPC for that memory block. In such embodiments, some mechanism (e.g., a partial response by the LPC and subsequent combined response) must be implemented to indicate to the cache sourcing the requested memory block that the LPC is within its local coherency domain. In other embodiments that do not support the communication of an indication that the LPC is local, an Ig, Sg or Slg state may be formed when a memory block is sourced to a remote coherency domain and therefore Ig, Sg and Slg may be formed imprecisely.

Several rules govern the selection and replacement of Ig, Sg and Slg (collectively referred to as Xg) cache entries. First, if a cache selects an Xg entry as the victim for replacement, a castout of the Xg entry is performed (unlike the case when an I or S entry is selected). Second, the castout of the Xg state is preferably performed as a local operation, or if performed as a global operation, ignored by a remote LPC of the castout address. If an Xg entry is permitted to form in a cache that is not within the same coherency domain as the LPC for the memory block, no update to the domain indicator in the LPC is required. Fourth, the castout of the Xg state is preferably performed as a dataless address-only operation in which the domain indicator is written back to the LPC (if local to the cache performing the castout).

Because cache directory entries including an Xg state carry potentially useful information, it is desirable in at least some implementations to preferentially retain entries in the Xg state over other entries having a same base state (e.g., S or I), for example, by modifying the Least Recently Used (LRU) algorithm utilized to evaluate LRU fields 318, 368 to select a victim cache entry for replacement. As Xg directory entries are retained in cache, it is possible for such entries to become "stale" over time in that a cache whose exclusive access request caused the formation of the Xg state may deallocate or writeback its copy of the memory block without notification to the cache holding the address tag of the memory block in the Xg state. In such cases, the "stale" Xg state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" sub-g cache entries.

Implementation of the Xg coherency states improves communication efficiency by maintaining a cached domain indicator for a memory block in a coherency domain, even when (in the case of Ig) no valid copy of the memory block remains cached in the coherency domain. As a consequence, an HPC for a memory block can service an exclusive access request (e.g., a bus RWITM or bus DClaim operation) from a remote coherency domain without retrying the request and performing a push of the requested memory block to the LPC.

VII. Exemplary L2/L3 Coherency State Transitions

Figure 6:
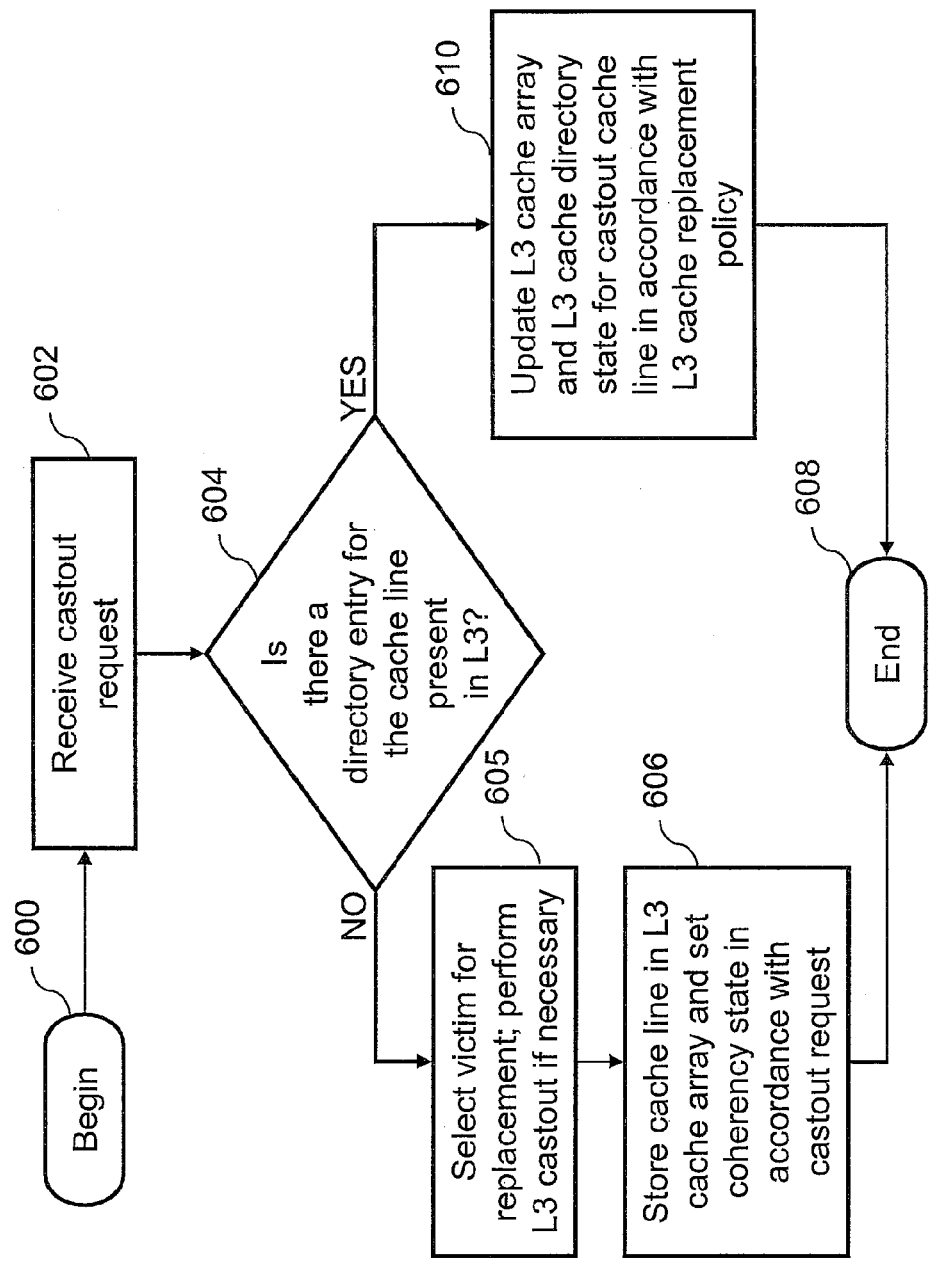
FIG. 6 is a high-level logical flow diagram of an exemplary method of performing cast-in to an L3 cache memory in accordance with a preferred embodiment of the present invention.

With reference now to FIG. 6, there is illustrated a high-level logical flow diagram of an exemplary method of performing cast-in to the L3 cache in accordance with a preferred embodiment of the present invention. The process depicted in FIG. 6 involves operations by the L3 cache controller 380. The process begins at block 600 and then proceeds to block 602, which depicts the L3 cache controller 380 of an L3 cache 232 (e.g., L3 cache 232a) receiving a castout request from one of the L2 caches 230 to which it is connected (e.g., L2 cache 230a) as a result of a cache line being evicted from the source L2 cache 230. The castout request contains a target address, the cast-in cache line, and a cache directory state of the cast-in cache line. L3 cache controller 380 is programmed with a replacement policy to determine whether the cast-in cache line will be saved in its data array 360 and, if so, the appropriate coherency state for the cache line in state field 366.

Next, at block 604, cache controller 380 reads the tag field 364 of L3 cache directory 362 to determine if a directory entry for the target address is already present. If the target address misses in tag field 364, the process passes to block 605, which depicts cache controller 380 selecting a victim cache line for replacement, which may be castout to system memory, depending upon the victim's coherency state (e.g., Xg, M, T, or Tn). The process then proceeds to step 606 where cache controller 380 stores the cast-in cache line received from the source L2 cache 230 in L3 data array 360 and creates a corresponding cache directory entry within cache directory 362. Cache controller 380 sets the coherency state field 366 of the directory entry in accordance with the state specified in the castout request. Thereafter, the process ends at block 608.

Returning to block 604, if cache controller 380 determines that a directory entry for the target address of the cast-in cache line is already present within the L3 cache directory 362, the process proceeds to block 610. Block 610 depicts L3 cache controller 380 updating the data array 360 and cache directory 362 by reference to castout request in accordance with a cast-in policy, described further below with reference to Table III and to FIG. 7. As implemented in a preferred embodiment of the present invention, the cast-in specifies (1) whether the cast-in cache line is stored within the L3 data array 360 or is discarded and (2) the coherency state of the corresponding entry in cache directory 366.

In a preferred embodiment, the cast-in policy implemented by L3 cache 232 when performing a cast-in for a cache line already having an entry in cache directory 362 is summarized in Table III below. Table III identifies the resulting coherency state in state field 366 as a function of the cache line's previous state in the L3 cache directory 362 and the coherency state specified in the castout request.

TABLE III

| Castout Request | Previous State in Cache Directory | | | | | | | | |
|---|---|---|---|---|---|---|---|---|---|
| State | In | Ig | I | Sg | Slg | S | Sl | Tx | Mx |
| In | In | Ig | In | Sg | Slg | S | Sl | Tx | Mx |
| Ig | Ig | Ig | Ig | Sg | Slg | Sg | Slg | Tx | Mx |
| Sg | <u>Sg</u> | <u>Sg</u> | <u>Sg</u> | Sg | Slg | Sg | Slg | Tx | err |
| Slg | <u>Slg</u> | <u>Slg</u> | <u>Slg</u> | Slg | Slg | Slg | err | Tx | err |
| S | <u>S</u> | <u>Sg</u> | <u>S</u> | Sg | Slg | S | Sl | Tx | err |
| Sl | <u>Sl</u> | <u>Slg</u> | <u>Sl</u> | Slg | Slg | Sl | err | Tx | err |
| Tx→T, Te, Ten, Tn | <u>Tx</u> | <u>Tx</u> | <u>Tx</u> | <u>Tx</u> | <u>Tx</u> | <u>Tx</u> | <u>Tx</u> | err | err |
| Mx→M, Me | <u>Mx</u> | <u>Mx</u> | <u>Mx</u> | err | err | err | err | err | err |

This cast-in policy further governs whether the memory block stored within the L3 data array 360 is to be retained or is to be overwritten by the cast-in cache line received from the source L2 cache 230. The determination of whether or not to overwrite the cache line data is represented in Table III by underlined resulting coherency states (e.g., Mx). If the resulting coherency state transition is underlined, the cast-in cache line is stored in L3 cache array 360 in lieu of the prior cache line data. If the resulting coherency state is not underlined, the cache line within cache array 360 is retained, and the coherency state in state field 366 is updated to the resulting coherency state identified in Table III.

Referring specifically to the Sg and Slg rows of Table III, if the current state of the cache line in L3 cache directory 362 is any of the In, Ig or I coherency states and the cast-in coherency state is either Sg or Slg, the cast-in coherency state is utilized to update state field 366. Also, as indicated by the underlined entries in Table III, the cache line is replaced with the cast-in data within the cache array 360. If the current state of the cache line in L3 cache directory 362 is Sg and the cast-in coherency state is Slg, the cast-in coherency state is utilized to update state field 366 so that the ability to source the data by cache-to-cache data intervention, as signified by the "1" in Slg, is retained; however, if the current state of the cache line in L3 cache directory 362 is the Sg state and the cast-in coherency state is Sg, no coherency or data update is made to L3 cache 232. Similarly, no coherency or data update is made to L3 cache 232 if the current state in L3 cache directory 362 is Slg and the cast-in state is Sg or Slg. If the current state of the cache line in L3 cache directory 362 is S or Sl and the cast-in coherency state is Sg, cache controller 380 updates state field 366 from S to Sg or from Sl to Slg to retain the cache indication that the domain indicator 504 should be updated. Cache controller 380 performs a similar coherency state update of an S state to Slg in response to receipt of a cast-in Slg coherency state. As further noted in Table III, the L2 and L3 caches cannot both contain a cache line in the Slx state, meaning that the Sl-Slg case indicates that an error has occurred. If the L3 current state is Tx or Mx as shown in the Tx and Mx columns, this information is always retained within the L3 cache upon a cast-in from an L2.

Turning now to the Sg and Slg columns of Table III, in the case of a cast-in the Tx coherency state, cache controller 380 performs both a data update to data array 360 and a coherency state update from either Sg or Slg to Tx. In each other case in which the previous coherency state recorded within cache directory 362 is Slg, no data or coherency state update is performed in response to receipt of a cast-in. For cache lines marked as Sg in cache directory 362, cache controller 380 performs a coherency state update from Sg to Slg in response to cast-in cache lines in the Sl or Slg coherency state, but performs no data or coherency state update for cast-ins in the In, Ig, Sg, or S coherency states.

Figure 7:
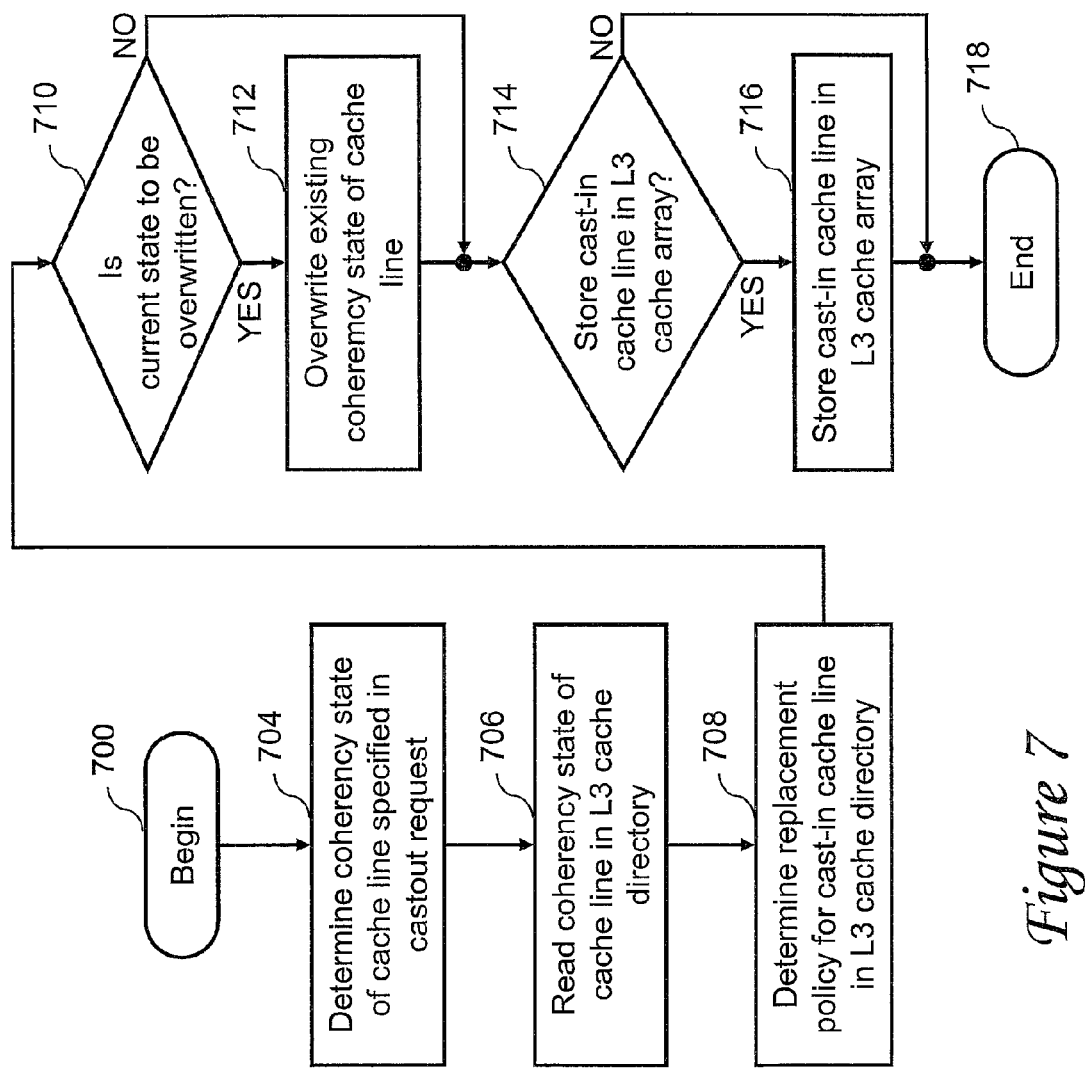
FIG. 7 is a high-level logical flow diagram of an exemplary method of implementing a coherency state transition policy in an L3 cache memory in response to a cast-in in accordance with a preferred embodiment of the present invention.

With reference now to FIG. 7, there is illustrated a high-level logical flow diagram of an exemplary method of a implementing a cast-in policy in an L3 cache in response to receipt of a castout request, in accordance with a preferred embodiment of the present invention. The process begins at block 700, for example, in response to an affirmative determination at block 604 of FIG. 6 and the passes to block 704, which illustrates L3 cache controller 380 examining the castout request to determine the specified coherency state of the victim cache line. In addition, at block 706 the L3 cache controller 380 reads the state field 366 of the relevant entry in cache directory 362 to determine the existing coherency state for the cast-in cache line. The process then proceeds to block 708, which illustrates L3 cache controller 380 determining the appropriate resulting coherency state in the L3 cache directory 362 according to the cast-in policy summarized in Table III. This determination can be made, for example, by reference to a state table in non-volatile memory within the L3 cache 232. In alternative embodiments, L3 cache controller 380 may make the determination shown at block 708 through execution of software or through computations performed by integrated circuitry.

The process then proceeds to block 710, which depicts L3 cache controller 380 determining whether or not the existing coherency state for the victim cache line will be updated based on the resulting coherency state determined at block 708. If the current state is to be updated, the process proceeds to block 712, which represents cache controller 380 overwriting the coherency state in cache directory 362 with the resulting coherency state determined at block 708. The process proceeds from block 712, or from block 710 if no update to the coherency state is to be made, to decision block 714, which illustrates cache controller 380 determining whether or not the cast-in policy indicates that the cast-in cache line received from the L2 cache 230 is to be stored in the L3 data array 360. If so, the process proceeds to block 716, which depicts cache controller 380 storing the cast-in cache line in the L3 data array 360, thereby overwriting the previously stored cache line data for the cast-in target address. Following block 716, or block 714 if no data update is to be performed, the process ends at block 718.

In addition to influencing the way in which L3 cast-in operations are performed as discussed above with respect to Table III and FIGS. 6 and 7, the implementation of Sg and Slg coherency states in accordance with the present invention also simplifies the operations performed by an upper level cache, such as an L2 cache 230, in response to receipt of a CPU read request or CPU update request that hits on a cache line held by the L2 cache in the Ig coherency state. To facilitate understanding of an exemplary method of processing in an L2 cache 230 in response to such an operating scenario (which is depicted in FIG. 9), a conventional method of processing in an L2 cache will first be described with reference to FIG. 8.

Figure 8:
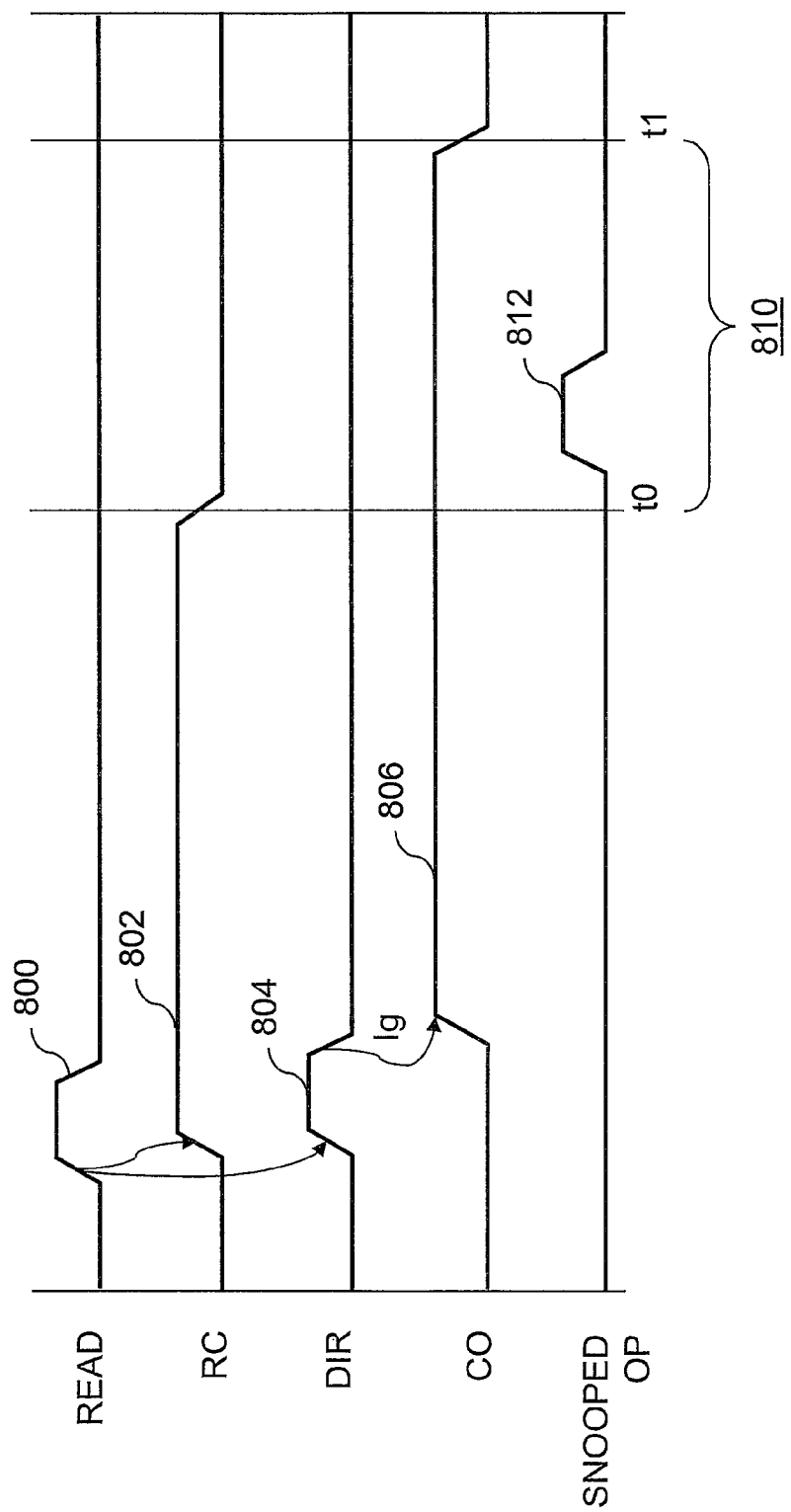
FIG. 8 is a timing diagram depicting a prior art operation flow in which a castout hit in an Ig coherency state creates a coherency resolution window in which the cache directory must be consulted to determine a proper coherency response to a snooped read-type operation.
Figure 9:
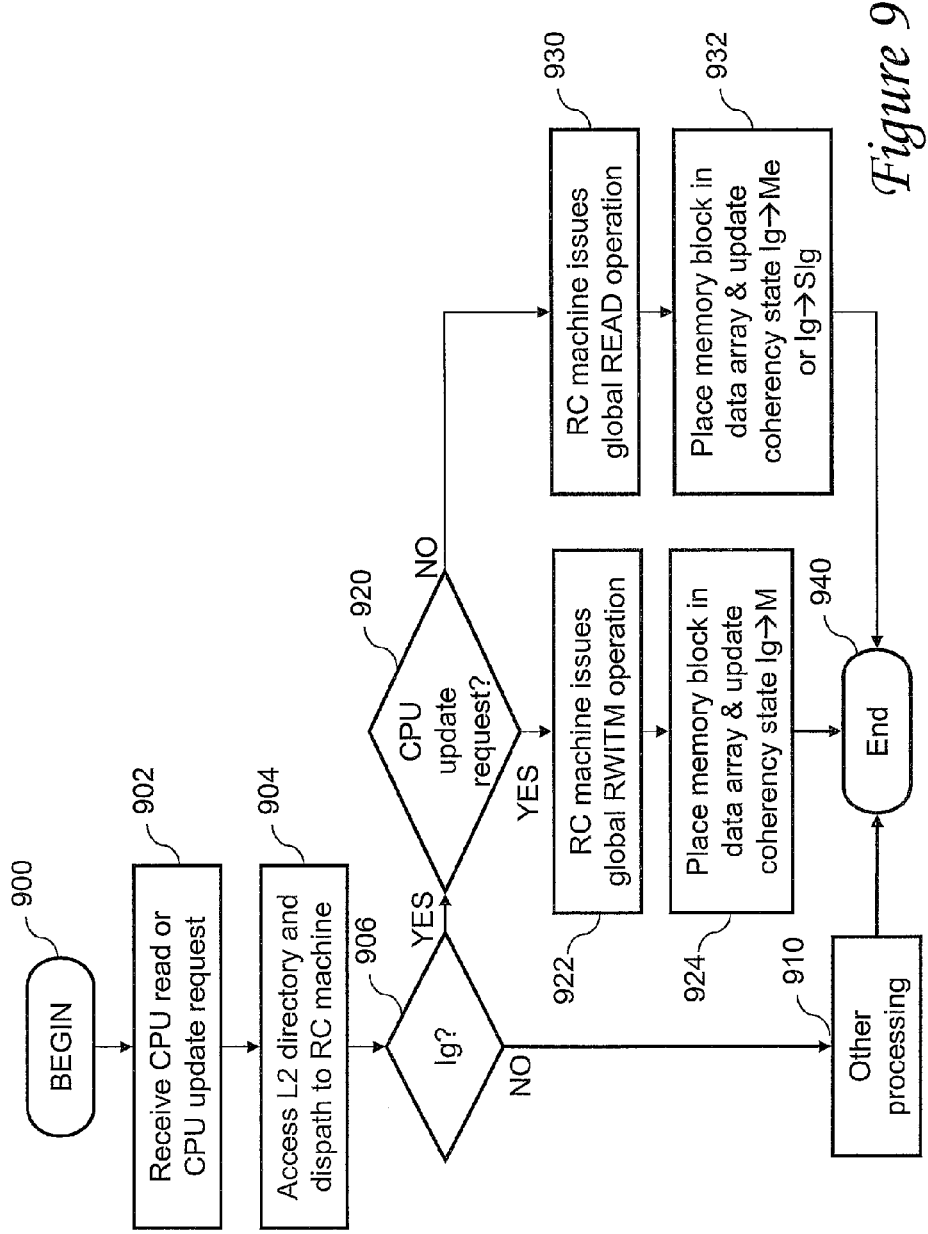
FIG. 9 is a high-level logical flow diagram of an exemplary method of a coherency state transition policy implemented by an L2 cache memory in accordance with the present invention.

Referring now to FIG. 8, there is depicted a timing diagram that shows the operations performed by a prior art L2 cache in response to receipt of a CPU read request that hits on a cache line held by the L2 cache in the Ig coherency state. As shown, the process begins when the prior art L2 cache receives a CPU read request 800 from its associated processor core. In response to receipt of the CPU read request, the L2 cache allocates an RC machine to service the request as shown at reference numeral 802 and initiates a directory read of its cache directory as shown at reference numeral 804.

In response to a determination that the coherency state recorded in the cache directory is Ig, the prior art L2 cache also allocates a CO machine, as depicted at reference numeral 806, in order to update the domain indicator in system memory to a "global" state so that coherency is maintained. The completion of the operations of the RC and CO machines is asynchronous, meaning that the operations can complete in any order. If the RC machine completes its operations at time t0 and the CO machine completes its operations at time t1, a coherency resolution window 810 is formed. By time t0, the RC machine has updated directory (e.g., to Shared) to reflect the state of the newly acquired cache line, but the CO machine is still actively working on the castout until time t1.

Ordinarily, only the coherency state reflected by an active machine in the L2 cache is considered when determining a partial response to an operation snooped on the interconnect. However, for operations snooped during coherency resolution window 810 that target the same cache line that is under processing by the CO machine this policy is inadequate, and both the directory state and the coherency state reflected by the active castout machine must be considered in determining the partial response to be provided for the snooped operation. Failure to do so could cause an incorrect coherency state to be formed at the requesting L2 cache, leading to a loss of coherency. Consequently, special coherency resolution logic must be implemented within the L2 cache to handle a snoop for the same cache line under processing by the CO machine during coherency resolution window 800.

The design of an L2 cache, and in particular its coherency processing under the operating scenario shown in FIG. 8, is simplified by the implementation of Sl and Slg coherency states in accordance with the present invention. With reference now to FIG. 9, there is illustrated a high level logical flowchart of an exemplary method of coherency processing in an upper level cache, such as an L2 cache 230, in accordance with the present invention. As shown, the process begins at block 900 and then proceeds to block 902, which illustrates an L2 cache 230 receiving a CPU read or CPU update request from its associated processor core 200. In response to receipt of the CPU request, which generally includes a transaction type (TTYPE) identifying the type of request and a target address, the L2 cache controller 330 of the L2 cache 230 accesses its cache directory 312 utilizing the target address to determine its coherency state with respect to the target address and dispatches an RC machine 332 to service the CPU request (block 904). As indicated at block 906, if cache controller 330 determines that the coherency state is Ig, cache controller 330 services the CPU request as depicted at block 920 and following blocks. If the coherency state is other than Ig, cache controller 330 services the CPU request utilizing other processing illustrated at block 910.

Referring now to block 920, in response to a determination that the coherency state for the target memory block of the CPU request is Ig in L2 cache directory 312, the dispatched RC machine 332 determines whether the TTYPE indicates a CPU update request and, if so, issues a bus RWITM operation of global scope on all local and global interconnects 110, 114 to obtain an exclusive copy of the target memory block (block 922). RC machine 332 selects a global operation scope based upon the imprecise indication provided by the Ig coherency state that an updated copy of the memory blocks resides in a remote coherency domain. When a copy of the target memory block is received, RC machine 332 places the target memory block in data array 310 and updates the coherency state of the corresponding entry in L2 cache directory 312 from Ig to M, as depicted at block 924. Thereafter, RC machine 332 is deallocated, and the process ends at block 940.

Referring again to block 920, if the RC machine 332 determines from the TTYPE of the CPU request that it is a CPU read request, the process passes to block 930. Block 930 illustrates RC machine 332 issuing a bus READ operation of global scope to obtain a copy of the target memory block. RC machine 332 again selects a global operation scope based upon the imprecise indication provided by the Ig coherency state that an updated copy of the memory blocks resides in a remote coherency domain. In response to receipt of the requested memory block, RC machine 332 places the memory block in data array 310 and updates state field 316 of the corresponding entry in cache directory 312 from the Ig coherency state to one of the Slg or Me states, as shown at block 932. In particular, RC machine 332 updates the coherency state to Me if the memory block was sourced by a memory controller 206 and no other cache holds a copy of the memory block and updates the coherency state to Slg otherwise. Thereafter, RC machine 332 is deallocated, and the process ends at block 940.

As will be appreciated, the implementation of Sg and Slg coherency states in accordance with the present invention simplifies coherency processing in at least two respects. First, because the cached indication of a global state of a domain indicator represented by the Ig state can be retained in the cache directory by either of the Sg or Slg coherency states, no CO machine 336 is allocated to castout the Ig coherency state in the event of an Ig hit for a CPU read request. Consequently, utilization of the finite resources within L2 cache controller 330 is decreased. Second, because no CO machine 336 is allocated to perform a castout in such cases, no coherency resolution window 800 is formed, and response logic 210 can determine the appropriate coherency state upon which to base partial response to a snooped request directly from cache directory 312. As a result, the logic implemented within response logic 210 is simplified.

As has been described, the present invention provides an improved method, apparatus and system for data processing in which a coherency state, such as Sg or Slg, is utilized to provide an indication that a particular memory block may be held in multiple caches and that a copy of the memory block resides outside a cache's local coherency domain. Implementation of one or more such coherency states advantageously permits a shared lower level (e.g., L3) cache to retain a copy of the memory block in the event of a castout hit on an Ig copy of the memory block. In addition, implementation of one or more such coherency states simplifies upper level (e.g., L2) cache design and streamlines coherency processing.

While the invention has been particularly shown and described with reference to a preferred embodiment, it will be understood by those skilled in the art that various changes in form and detail may be made therein without departing from the spirit and scope of the invention.

What is claimed is:

1. A method of data processing in a multiprocessor data processing system including at least first and second coherency domains, wherein the first coherency domain includes at least one processing unit, a system memory and a cache memory, the method comprising:
 buffering a cache line in a data array of the cache memory; and
 setting a state field in a cache directory of the cache memory to a coherency state to indicate that:
 the cache line is valid in the data array,
 the cache line is held in the cache memory non-exclusively and is unmodified with respect to a corresponding memory block in the system memory,
 another cache in said second coherency domain may hold a copy of the cache line, and
 a domain indicator in the first coherency domain, which has a first state indicative of a first scope of coherency communication for the cache line that excludes the second coherency domain and a second state indicative of a second scope of coherency communication for the cache line that includes the second coherency domain, will have to be updated to the second state.

2. The method of claim 1, wherein:
 said cache memory is a lower level cache memory;
 said data processing system includes multiple upper level cache memories coupled to said lower level cache memory;
 said coherency state is a first coherency state; and
 said setting comprises updating said state field to said first coherency state from a second coherency state indicating that said cache line is invalid in response to a cast-in of the cache line into said data array from one of the multiple upper level cache memories.

3. The method of claim 1, wherein:
 said cache memory is coupled to an interconnect of the data processing system;
 said coherency state is a first coherency state;
 said method further comprises said cache memory issuing a request for the cache line on the interconnect;
 said setting comprises:
  in response to a receipt of the cache line as a response to the request, updating said state field to said first coherency state from a second coherency state indicating that said cache line is invalid and that another cache in said second coherency domain holds a copy of the cache line.

4. The method of claim 1, and further comprising:
 selecting said cache line for eviction from the data array; and
 in response to selecting the cache line for eviction, the cache memory performing a dataless castout of an indication that another cache in said second coherency domain holds a copy of the cache line.

5. The method of claim 4, and further comprising:
 in response to receipt of the indication that another cache in said second coherency domain holds a copy of the cache line, a memory controller of said system memory updating the domain indicator for the cache line.

6. The method of claim 1, wherein said coherency state further indicates that said cache memory has authority within the first coherency domain to source a copy of the cache line by cache-to-cache data intervention.

7. A processing unit for a multiprocessor data processing system including at least first and second coherency domains, wherein the first coherency domain includes a system memory and the processing unit, said processing unit comprising:
 a processor core; and
 a cache memory coupled to the processor core, said cache memory including:
  a data array that holds a cache line;
  a cache directory including an entry associated with said cache line, said entry including a state field; and
  a cache controller that sets said state field to a coherency state to indicate that:
   the cache line is valid in the data array,
   the cache line is held in the cache memory non-exclusively and is unmodified with respect to a corresponding memory block in the system memory,
   another cache in said second coherency domain may hold a copy of the cache line, and
   a domain indicator in the first coherency domain, which has a first state indicative of a first scope of coherency communication for the cache line that excludes the second coherency domain and a second state indicative of a second scope of coherency communication for the cache line that includes the second coherency domain, will have to be updated to the second state.

8. The processing unit of claim 7, wherein:
 said cache memory is a lower level cache memory;
 said processing unit includes multiple upper level cache memories coupled to said lower level cache memory;
 said coherency state is a first coherency state; and
 said cache controller updates said state field to said first coherency state from a second coherency state indicating that said cache line is invalid in response to a cast-in of the cache line into said data array from one of the multiple upper level cache memories.

9. The processing unit of claim 7, wherein:
 said cache memory is coupled to an interconnect of the data processing system;
 said coherency state is a first coherency state;
 said cache controller, responsive to receipt of the cache line as a response to a data request, updates said state field to said first coherency state from a second coherency state indicating that said cache line is invalid and that another cache in said second coherency domain holds a copy of the cache line.

10. The processing unit of claim 7, wherein said cache controller, responsive to selection of the cache line for eviction from the data array, performs a dataless castout of an indication that another cache in said second coherency domain holds a copy of the cache line.

11. The processing unit of claim 7, wherein said coherency state further indicates that said cache memory has authority within the first coherency domain to source a copy of the cache line by cache-to-cache data intervention.

12. A data processing system, comprising:
 at least first and second cache coherent coherency domains coupled together, wherein the first coherency domain includes a first processing unit and a domain indicator, said second coherency domain includes a second processing unit, and a system memory is disposed in at least one of said first and second coherency domains, said first processing unit comprising:
 a processor core; and
 a cache memory coupled to the processor core, said cache memory including:
  a data array that holds a cache line;

a cache directory including an entry associated with said cache line, said entry including a state field;

a cache controller that sets said state field to a coherency state to indicate that: the cache line is valid in the data array,
- the cache line is held in the cache memory non-exclusively and is unmodified,
- another cache in said second coherency domain may hold a copy of the cache line, and
- the domain indicator in the first coherency domain, which has a first state indicative of a first scope of coherency communication for the cache line that excludes the second coherency domain and a second state indicative of a second scope of coherency communication for the cache line that includes the second coherency domain, will have to be updated to the second state.

13. The data processing system of claim 12, wherein:
said cache memory is a lower level cache memory;
said first processing unit includes multiple upper level cache memories coupled to said lower level cache memory;
said coherency state is a first coherency state; and
said cache controller updates said state field to said first coherency state from a second coherency state indicating that said cache line is invalid in response to a cast-in of the cache line into said data array from one of the multiple upper level cache memories.

14. The data processing system of claim 12, wherein:
said cache memory is coupled to an interconnect of the data processing system;
said coherency state is a first coherency state;
said cache controller, responsive to receipt of the cache line as a response to a data request, updates said state field to said first coherency state from a second coherency state indicating that said cache line is invalid and that another cache in said second coherency domain holds a copy of the cache line.

15. The data processing system of claim 12, wherein said cache controller, responsive to selection of the cache line for eviction from the data array, performs a dataless castout of an indication that another cache in said second coherency domain holds a copy of the cache line.

16. The data processing system of claim 15, and further comprising:
a memory controller of said system memory, wherein said memory controller, responsive to receipt of the indication that another cache in said second coherency domain holds a copy of the cache line, updates the domain indicator for the cache line.

17. The data processing system of claim 12, wherein said coherency state further indicates that said cache memory has authority within the first coherency domain to source a copy of the cache line by cache-to-cache data intervention.

* * * * *